United States Patent
Hjelmström et al.

(10) Patent No.: US 11,582,382 B2
(45) Date of Patent: Feb. 14, 2023

(54) ARRANGEMENT FOR ASSESSING AMBIENT LIGHT IN A VIDEO CAMERA

(71) Applicant: Axis AB, Lund (SE)

(72) Inventors: Jonas Hjelmström, Lund (SE); Ola Håkansson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/591,653

(22) Filed: Feb. 3, 2022

(65) Prior Publication Data
US 2022/0294978 A1    Sep. 15, 2022

(30) Foreign Application Priority Data
Mar. 15, 2021 (EP) .................................... 21162614

(51) Int. Cl.
*H04N 5/232* (2006.01)
*G01J 1/42* (2006.01)

(52) U.S. Cl.
CPC ........ *H04N 5/23216* (2013.01); *G01J 1/4204* (2013.01)

(58) Field of Classification Search
CPC ...... H04N 5/23216; H04N 5/58; H04N 5/238; H04N 5/2351; H04N 5/2254; H04N 5/2251; G01J 1/4204; G03B 7/097; G03B 7/0997; G03B 42/00
See application file for complete search history.

(56) References Cited

U.S. PATENT DOCUMENTS

| | | | |
|---|---|---|---|
| 4,171,889 A | * | 10/1979 | Agari ................. G03B 7/09976 396/267 |
| 2011/0001871 A1 | | 1/2011 | Shintani et al. |
| 2013/0248691 A1 | | 9/2013 | Mirov et al. |
| 2016/0202115 A1 | * | 7/2016 | Lam ..................... G01J 1/4204 250/206 |
| 2019/0327400 A1 | | 10/2019 | Bai |

FOREIGN PATENT DOCUMENTS

| | | |
|---|---|---|
| CN | 207491072 U | 6/2018 |
| JP | 2003-161981 A | 6/2003 |
| JP | 2005-037490 A | 2/2005 |
| WO | 2020/151942 A1 | 7/2020 |

OTHER PUBLICATIONS

Extended European Search Report dated Aug. 13, 2021 for European Patent Application No. 21162614.8.

* cited by examiner

*Primary Examiner* — Nelson D. Hernández Hernández
(74) *Attorney, Agent, or Firm* — Volpe Koenig

(57) ABSTRACT

An arrangement for determining an amount of light reaching an image sensor of a video camera, the video camera comprising an imaging lens system guiding a beam path towards an image sensor, wherein the arrangement comprises a transparent probing element through which the beam path passes on its way to the image sensor, and a light sensor arranged in an end of the transparent probing element. The light sensor is arranged to collect light being scattered or reflected in the transparent probing element.

13 Claims, 2 Drawing Sheets

ARRANGEMENT FOR ASSESSING AMBIENT LIGHT IN A VIDEO CAMERA

FIELD OF INVENTION

The present invention relates to an arrangement, in a video camera, for assessing a measure of ambient light in the operation of a video camera, and also relates to imaging optics comprising such arrangement.

TECHNICAL BACKGROUND

The use of IR (infra-red) filters for cameras is well known in the art, and in particular in relation to digital cameras. In short, the image sensor of the camera has a spectral response with a non-negligible component in the infrared, resulting in opportunities as well as in challenges. An opportunity lies in that in low-light conditions the IR-component may provide useful additional information about the imaged scene, information which may be enhanced even further by means of an IR-light source. During day-time imaging, where there is ample light to provide color imaging, the presence of an IR-component may distort or destroy the color balance in the image.

A way of maintaining the beneficial effects while suppressing the less beneficial effects is to add a movable IR-cut filter in the beam path in front of the image sensor during day-mode operation, such that the IR-component is removed. In this way, the IR filter may be used during daylight conditions, enabling acquisition of color images. During day-mode operation pixels of the image sensor will operate in a spectrally resolved manner, where the incident light detected as a charge on individual photodetectors. Each photodetector is provided with a filter so as to receive mainly red, mainly green, or mainly blue radiation, thus enabling color separation. This is well-known technology, and a Bayer filter is an example of such a color filter array that may be used. During night-mode operation, e.g., in low-light conditions, the IR-cut filter may be removed. This means that there will be an increase in incoming light (or radiation) emanating from the IR-portion of the spectrum, an increase that can be used to improve the image quality but with the price of render color imaging difficult or impossible, since every color channel has a response in the IR-region. This will skew the color information by the addition of an unknown factor in each color channel. Therefore, instead of performing a color separation during night-mode operation, the only parameter being maintained is the total intensity of the incoming radiation, for each pixel, which may be presented as a gray-scale intensity image (or in any desirable color scale). The addition of an IR light source may enhance the image even further.

In the straightforward solution an IR-cut filter is arranged in front of the sensor, and an actuator is used for moving the filter between a position in which it completely covers the sensor ('day-mode') and a position in which it is completely removed from obscuring the image sensor ('night-mode'). When switching from night-mode to day-mode it is not uncommon that the light level with the IR-filter in the beam path is too low, and that a switch back to night-mode is necessary, resulting in a back-and-forth flickering between night-mode and day-mode. This results in noticeable flickering of the image, and a considerable wear on the actuator. Consequently, switching back and forth is not beneficial to user experience, and therefore there may be an assessment prior to the switch, in which the imaging unit tries to deduce the amount of visible light in the scene so as to be certain that a switch to day-mode is advisable.

The present embodiments mainly relate to an arrangement enabling improvements in the assessment of ambient light in a scene. The arrangement may be used in many circumstances but has particular advantages when operating in night-mode and deciding whether a transfer to day-mode would be advisable or not.

SUMMARY

With the purpose of providing an improved solution in comparison with known technology, the present embodiments relate to an arrangement for determining an amount of light reaching an image sensor of a video camera. The video camera comprises an imaging lens system guiding a beam path towards an image sensor. The arrangement is characterized in that it has a transparent probing element through which the beam path passes on its way to the image sensor, and in that a light sensor is arranged in an end of the transparent probing element, such that the light sensor is arranged to collect light being scattered or reflected in the transparent probing element.

The arrangement enables a continuous (or intermittent) monitoring of an amount of light travelling towards the image sensor. Adjustment of the imaging lens system, more particularly variation in zoom or aperture size, will alter the amount of light being directed towards the image sensor. The inventive arrangement, in that it probes the entire beam path, will account for such variations, and a measure of the amount of light will be relevant for what is actually captured by the image sensor. Moreover, measurements may be performed during acquisition of a video sequence, due to the transparent probing element, i.e., while the image sensor is active with acquisition of images.

In one or more embodiments the light sensor is mounted to one lateral edge of the transparent probing element. This location of the light sensor is convenient from a manufacturing perspective. Further, in this way the entire transparent probing element may work as a light guide. The transparent probing element is typically an element which is thin in a direction of the beam path, so as not to obstruct the beam path too much, and light that has started to scatter inside the element will be more likely to exit at a lateral edge at a higher intensity. A schematic explanation to this is light being scattered internally inside the transparent prober element will either exit the element directly (homogenously over the large surfaces of the element, and thus with a weak intensity) while all other light will be guided between the large surfaces by means of total internal reflection towards the lateral edges with a significantly smaller surface, resulting in a higher available intensity.

To further increase the intensity of the light being guided to the light sensor, lateral edges of the transparent probing element may in one or more embodiments be configured to reflect wavelengths detectable with the light sensor. The reflectivity may be accomplished by means of a surface coating or a prism shape of the lateral edges.

With one or several embodiments, and with a purpose of improving efficiency and providing simplicity, the transparent probing element doubles as a dummy glass filter used during night-mode operation. A dummy glass, or dummy glass filter, is a component that is available in most video cameras having a night-mode operation and a day-mode operation. The need for the dummy glass arises during night-mode operation when an IR-cut filter, arranged during day-mode operation in order to remove IR-radiation from reaching the image sensor, is removed from the beam path. The IR-cut filter will refract rays travelling towards the image sensor, and if it is removed without any other action the image will become out of focus. By inserting a dummy glass, the refraction will be constant, and by that the focus as well. An effect of this family of embodiments is that measurements may only be performed during night-time operation (when the dummy glass is positioned in the beam path).

The transparent probing element may be arranged in front of the image sensor, closer to the image sensor than to an aperture plane of the imaging lens system, which may be an appropriate position since it is a place where there may be available space. Furthermore, a position closer to the image sensor enables for the arrangement to be a part of the video camera rather than of the lens system, and by that lenses may be switched freely without consideration of whether the lens system comprises an inventive arrangement or not.

In other embodiments the transparent probing element, in the form of dummy glass or not, is arranged between lenses of the imaging lens system, near or in an aperture plane of the imaging lens system. This position requires that the arrangement is small in size and that care is taken not to interfere with motion any motion of the optics. On the other hand, this is not an uncommon position for the IR-cut filter and the dummy glass, which makes it a straightforward position for the inventive arrangement. The IR-cut filter, the dummy glass, and the arrangement may be provided in a single unit, which may or may not also include a variable aperture (e.g. an iris aperture). Combining all these components into a single unit may as a whole provide a space efficient solution where the inventive arrangement will be well protected. A position in or near the aperture plane also has an advantage of reducing the risk of inducing visible effects in an image acquired with the image sensor.

For the sake of completeness, it may be said that in any embodiment the transparent probing element may be an optical flat, i.e., and element with excellent optical properties in terms of surface quality and the material used. This is typically what is preferred for a dummy glass as well.

In one or more of these embodiments the light sensor is configured to measure a light level during a time exceeding an exposure time for the video camera. This is an effect of the low light intensities reaching the light sensor, after all, the imaging system will be optimized for as much light as possible to reach the image sensor. Long integration times for the light sensor will make it less suitable for use as an input for adjusting exposure settings, yet it will work very good for supporting a decision of whether it is time to switch from night mode to day mode. In a related embodiment the arrangement is configured to control a switch between a night-mode and a day-mode. This basically only means that the signal from the light sensor is directly or indirectly (e.g., via a micro-control unit or a central processing unit) guided to a filter switch control.

In one or more embodiments the arrangement is retractably arranged, such that it may be inserted into, and retracted out of, the beam path. This is the case when the transparent probing element is embodied as a dummy glass, since a dummy glass typically is retractably arranged in a unit also comprising the IR-cut filter. Yet, even if the transparent probing element is a dedicated component it may be arranged in a retractable manner.

In other embodiments the arrangement is fixedly mounted. A fixed arrangement will enable a more space-efficient construction, since the need for an actuator for moving the arrangement into and out of position will be eliminated.

According to a related aspect, it may be embodied in a lens system or a video camera comprising an arrangement as described above or below.

DETAILED DESCRIPTION

Figure 1:
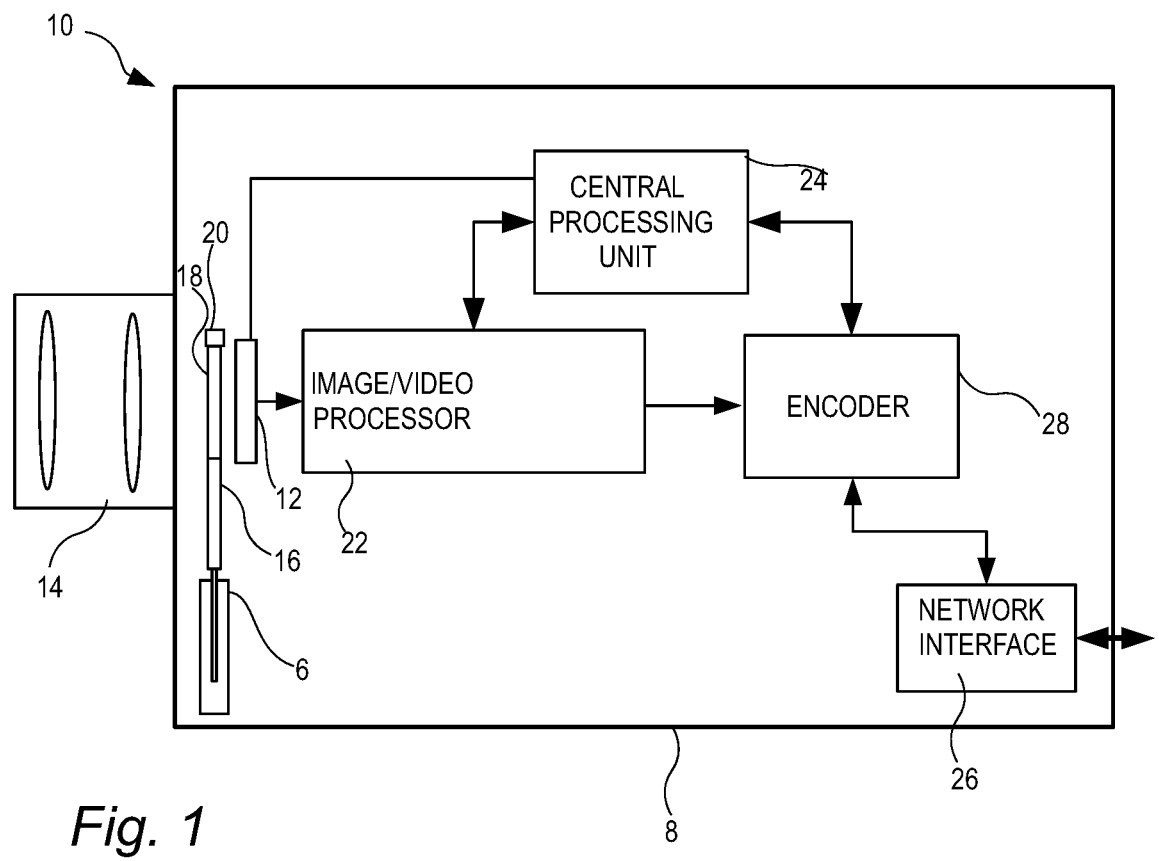
FIG. 1 is a schematic view of a camera setup, according to a generalized embodiment.

FIG. 1 illustrates a camera setup provided with an arrangement according to one embodiment. A main aim of the embodiments set forth hereinafter is that the arrangement is capable of providing a measure of the intensity of light reaching the sensor—and only this light. With this capability it will be possible not only to assess ambient light, but to accommodate settings to a part of the scene actually imaged by the camera. A video camera, suggestively a surveillance camera 10 has an image sensor 12 and imaging optics 14. At least one spectral filter, the IR-cut filter 16, is arrangeable in front of the image sensor 12, and may be switched between a position in which the image sensor is covered by the filter and one in which it is not. The switch is performed using an actuator 6, symbolized by piston in FIG. 1. In an actual application the IR-cut filter is typically arranged in a separate unit (not shown) and side by side with a dummy-filter (to be described) so that when one filter is removed in a lateral motion the other takes its place. The phrase "the image sensor is covered by the filter" should be construed as that the filter is arranged such that it affects all radiation reaching the image sensor. It may be arranged immediately in front of the image sensor, such that it more or less literally covers it, but it may as well (instead) be arranged in other locations, such as within the imaging the optics, in front of the imaging optics, etc. From a practical standpoint, the IR-cut filter is arranged where there is enough room for the filter and the control mechanism, and where it is reasonably well protected from physical tampering. Referring back to the unit containing the IR-filter and the dummy filter, such a unit could also contain a variable aperture. Anyway, in this way it is possible to control a spectral region of the light (or radiation in the case of any UV or IR being transmitted) reaching the image sensor 12. FIG. 1 also shows a transparent probing element 18 with an associated light sensor. Features of the transparent probing element 18 will be elaborated on further, following a short introduction of spectral filtering and color imaging.

Figure 2:
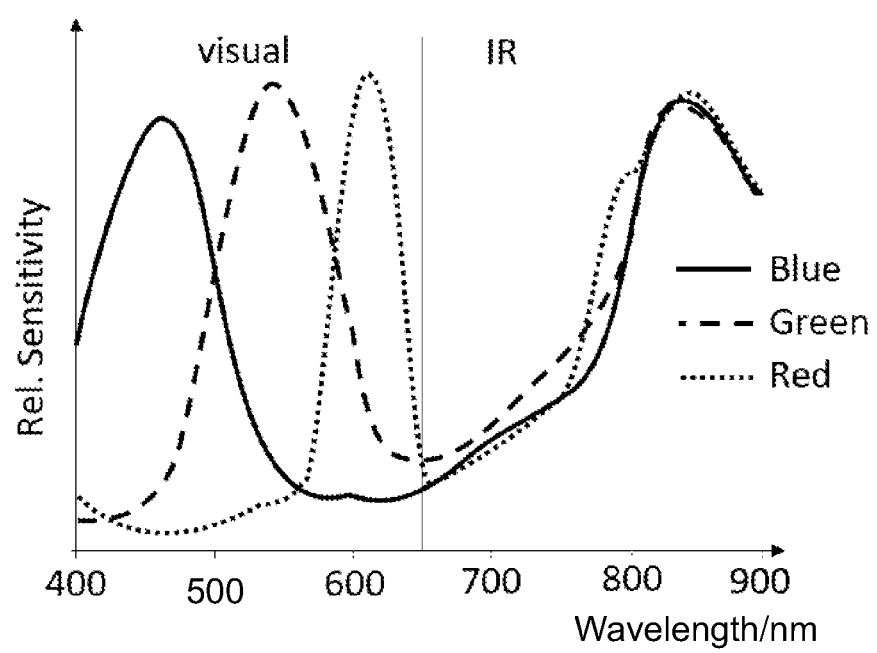
FIG. 2 is a schematic diagram illustrating the spectral response of a standard sensor chip.

Referring briefly to FIG. 2, when the IR-cut filter is arranged in front of the sensor during day-mode operation the entire IR-portion of the spectrum is removed, meaning that a signal measured by the red, green, and blue channel, respectively, may be resolved and converted to a color image. The incident light is separated into different color channels by use of a color filter array arranged in front of, or even combined with, the image sensor. A Bayer filter is a color filter array commonly used for this purpose. Notably, as also indicated in FIG. 2, each color channel has a spectral response in the NIR spectral region, meaning that each color filter in the color filter array (the Bayer filter) will have a transmission in the IR-region) and as the IR-cut filter is removed from the image sensor, in night-mode operation, this part of the spectrum will be incident on the image sensor as well. This will significantly increase the amount of collected radiation at the cost of losing the possibility to reproduce a true color representation of the scene, which is why it is common practice to use a grayscale representation in night-mode imaging. In this night-mode operation an image quality may be further increased by arranging an IR-illumination source, providing a scene illumination having the desired effect while still not being visible or disturbing to the human eye, since it resides outside of the visible wavelength spectrum. As the IR-cut filter 16 is removed, when transferring to night-mode imaging, it is common that a dummy filter 18 takes its place. The purpose of the dummy filter is to mimic the refraction caused by the IR-cut filter, such that image focus is maintained the same for day-mode and night mode imaging.

Returning to FIG. 1 and to the first embodiment, this dummy filter 18 acts as the transparent probing element, and therefore the same reference number will be used for these components. Even though the transparent probing element does not have to be embodied by the dummy filter 18, there are obvious advantages in dual use of a component. A light sensor 20 is arranged at one lateral side of the transparent probing element 18 (the dummy filter). The advantage of having the light sensor arranged at one lateral side (an edge) has been discussed, which does not exclude that it could be positioned in other locations instead. The transparent probing element 18 has the purpose of collecting light for the light sensor, it should collect light from the entire cross section of the beam path, or rather, each ray of light reaching the image sensor should be probed. This is so as not to favor any particular area of the image sensor (i.e. to acquire a measure of an amount of visible light in the imaged scene) when the ambient light level is assessed. With the setup of this, and other, embodiments the assessed light will follow any changes in the imaging optics, such as changes in zoom, since it probes all light heading towards the sensor. In other words, it will not include light not heading for the sensor, which is good since this light will not, and should not, affect exposure settings and evaluations of whether a switch from night-mode to day-mode is advisable or not. In an inventive setup the amount of light collected is quite low, the inventive arrangement should affect the amount of light reaching the image sensor as little as possible. Since the amount of light collected is comparatively low, use of longer integration times are preferred. If required the integration time, i.e. the measuring time or exposure time, of the light sensor can be quite long, from fractions of a second, up to seconds, several seconds, or even minutes, depending on the situation. Consequently, light sensors enabling such long integration times would be beneficial to use when needed. In situations where the amount of light is low (and longer integration times are preferred), light sensors having a low internal noise are preferred—for obvious reasons. Longer integration times will make the inventive arrangement better suited for determining when a switch from night mode to day mode than for, e.g., affecting exposure settings during operation. The sensor 20 will detect light having reflected and scattered off the surface of the transparent probing element 18, as well as light having scattered against imperfections in the transparent probing element 18 or merely by the material in the transparent probing element as such. Further to this, the transparent probing element 18 is configured to affect the light reaching the sensor as little as possible (as is normally the case for a regular dummy filter as well). What enables all these criteria to coexist is that the integration times, i.e. the measuring times, of the light sensor can be quite long. From fractions of a second, up to seconds, several seconds, or even minutes, depending on the situation.

Figure 3:
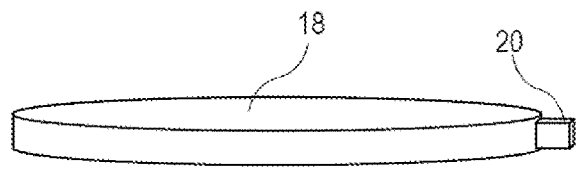
FIGS. 3 and 4 are two different schematic perspective views, illustrating examples of probing element that may be used in embodiments.
Figure 4:
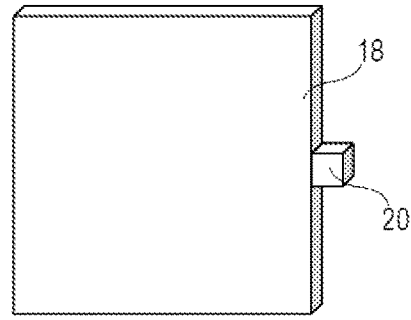

The shape and size of the transparent probing element 18 may differ between embodiments and mainly then with the position of the transparent probing 18 element. In several embodiments it, for obvious reasons, would have the shape and size of a dummy filter, since it would be the same component. FIGS. 3 and 4 illustrates two possible shapes, mainly for the reason of making it more concrete. One circular shape and one rectangular (or square) shape is shown. For both element shapes, the light sensor 20 is arranged at one lateral edge (or at a position along the lateral edge in the case of the circular shape).

As mentioned before, the transparent probing element does not have to be embodied as the dummy filter. There may be several reasons for this. One may be that there is no room for arranging the light sensor in a filter mechanism. Another reason may be that it would be more cost efficient to associate the transparent probing element and its corresponding light sensor 20 with or in a video camera 10 such that lens systems may be switched freely (without having to use lens systems with an inventive arrangement in them). In such embodiments the transparent probing element would preferably be statically arranged (as oppose to retractable), which is possible since it only absorbs a negligible amount of radiation and preferable since it reduces complexity. Such statically arranged transparent probing element may be arranged close to the image sensor 12, well protected inside the video camera, and readily connectable to the required processing capabilities. A statically arranged transparent probing element could of course be positioned in the lens system 14 instead, should it be considered appropriate, e.g. from a space-constraint consideration, from a technical complexity consideration or as a result of a functionality upgrade of an existing lens system.

Figure 5:
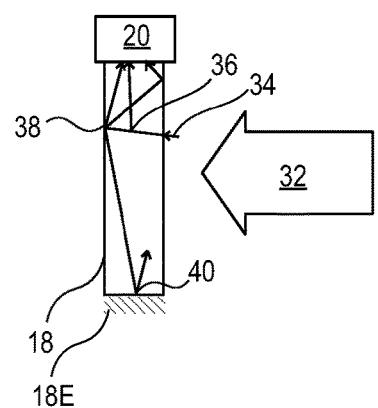
FIGS. 5 and 6 are sectional views illustrating further features of probing elements that may be used in embodiments.
Figure 6:
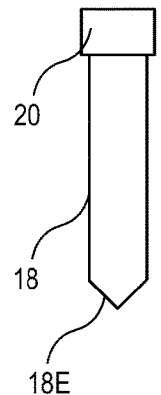

In a second embodiment, lateral edges (but for the portion where the light sensor 20 is arranged) are made reflective, so as to increase the signal receiving the light sensor. As mentioned before, the amount of light reaching the light sensor 20 is low. The reflective feature may be accomplished in many different ways, and may be more or less elaborate. One option is to coat the lateral edges with a reflective coating, as illustrated in the sectional view of FIG. 5 or by giving the lateral edges a prism shape, as illustrated in the sectional view of FIG. 6. The reflective feature may be applied to more or less all lateral edges of the probing element, but of course for the position of the light sensor 20. These embodiments may be combined, and the solutions may be applied to the lateral edge where the light sensor 20 is arranged as well, although an outcoupling for the light sensor should obviously be arranged in an adequate manner. In FIG. 5 a beam falling in on the transparent probing element 18 is symbolized by an arrow 32. A single incident ray of light 34 is shown passing through the element 18. On its way the ray 34 will scatter at 36 (and everywhere else) as a result of imperfections in the element 18, and it will scatter and reflect 38 against surfaces. Some of the scattered or reflected light will reach the sensor 20 directly while other rays will experience further reflections and use of the reflective surface 18E will increase the amount of light being reflected 40 towards the light sensor 20. It should be noted that the description is very basic; the direction of lines indicating light rays does not correspond to calculated directions, and their thickness does not correspond to any measure of amount being reflected. Outer surfaces of the dummy filter (or the transparent probing element) would in most cases have an anti-reflection coating, so the fraction being reflected would be quite small. Further, the material used for these elements would be of high optical grade, so the scattering due to imperfections or particles in the mass and surfaces would be low as well. Nevertheless, these measures will never be perfect, and the amount of light reaching the light sensor 20 has been considered sufficient for the purposes of the present teachings.

Figure 7:
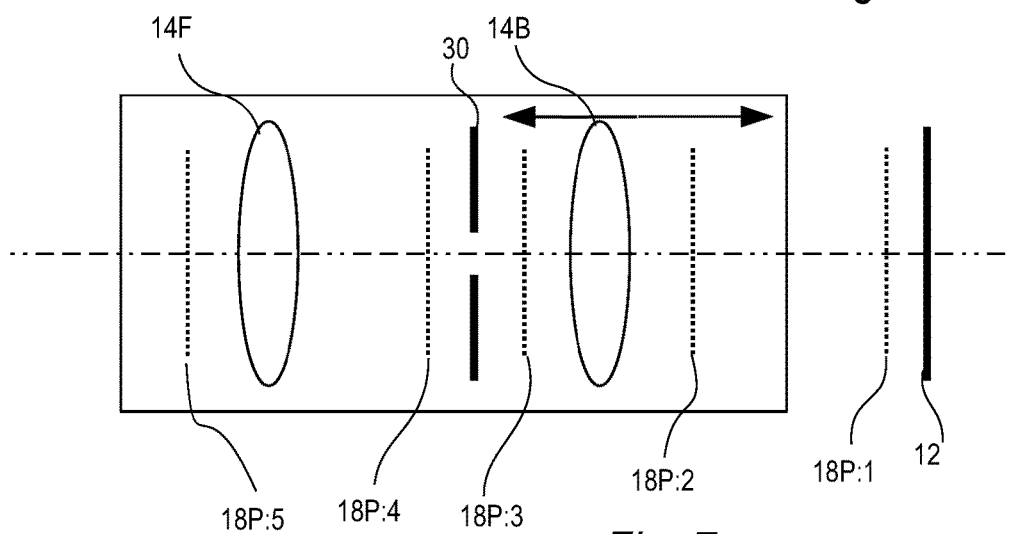
FIG. 7 is a schematic view of an imaging lens system, where possible positions fora probing element in embodiments.

FIG. 7 is a schematic view of a lens system having a front lens 14F and a back lens 14B, basically a very simplified version of a more complex lens. It could be seen as an elaboration of the rudimental lens system 14 of FIG. 1. One of the lenses 14B is movable, which is indicated by arrows, and some positions for the transparent probing element 18 are indicated by the dotted lines at reference numerals 18P:1-5. When the system zooms out, the lenses are far apart, and when the system zooms in, the lenses comes gradually closer to each other. Both lenses may be movably arranged. Between the lenses is located an aperture plane or aperture stop, where typically an iris diaphragm 30, or other type of variable aperture to control an intensity of light reaching the image sensor, is arranged. There is an added benefit in having the filter close to the aperture plane or the aperture stop, where the iris diaphragm or other variable aperture is arranged, e.g., at 18P:3 or 18P:4. In a normal configuration the aperture plane represents a position where there is no spatial correlation with the plane of the image sensor 12; every point of the aperture plane contains light rays ending up in every point of the image sensor and blocking a part of the beam path will result in a global reduction of intensity at the image plane rather than a local shadowing. Sometimes this is referred to as the aperture stop, wherein the aperture stop limits how much light from each point of the object that reaches a conjugate image point (the sensor in our case). Aperture stop thus defines a plane in the beam path, and sometimes the term "aperture plane" is used for the same feature. A feature of this plane is that it is a position in which alterations in a size of a diaphragm aperture will affect the entire image plane equally, at least in an ideal situation. This may for some application be a suitable position for the inventive arrangement, where 18:P3 would be preferable. A smaller probing element may be of a smaller size, since all light passes quite small aperture. However, the space available is often very limited. For some lens systems the movable lens section will almost touch the stationary lens section in one extreme. For such lens systems the arrangement may have to be positioned elsewhere. Varifocal lens system and parfocal lens systems used in real products typically comprise a large number of optical components and are significantly more complex than what is shown in the present drawing.

In one preferred embodiment the arrangement is positioned in a filter unit comprising the IR-cut filter and the dummy filter (doubling as the transparent probing element) and preferably also a variable aperture. Such a unit would have one actuator for the filter movement and one actuator for varying the size of the variable aperture (if that component is included in the unit). By use of such unit the inventive arrangement will be well-protected and it will also facilitate a space-efficient construction. Such units (minus the light sensor 20) are commercially available and could provide a suitable starting point for providing and inventive arrangement.

In front of the front lens, at position 18P:5 is another possible position. The advantage of this position is that there may be some more room, while a drawback is that the light sensor will be less—if at all—selective in regard of light collected. It will indeed probe all light reaching the image sensor, but also light that will never reach the image sensor. The arrangement could be screened off to enhance the collection of light from a forward direction, but it is apparent that it would not be affected by a variation in zoom level and it would rather give a measure of a total ambient light. This may be adequate for some applications, but one benefit would be lost. This will be partially true for positions until after the aperture stop (after a diaphragm). Therefore, a position somewhere between the aperture stop and the image sensor will be preferable, such as P18:1-3.

A position behind the back lens is also possible, at 18P:2, while it for reasons of limited space also may be a difficult position to choose, in particular if it has to be housed within the lens system. A remaining option is to position the arrangement closer to the image sensor, more or less inside of the camera housing 8, at position 18P:1, where there is some more room. This basically corresponds to the situation of FIG. 1. Again, it should be emphasized that the schematic drawing of FIG. 7 is very simplified, which is readily understood if comparing to an actual varifocal or parfocal lens system.

For each of these positions, an arrangement will be simplified if the probing element is fixedly mounted, such that it is always present in the beam path, since there would not need to be any room for the actuator 6 and the IR-cut filter 16. Where possible it may be combined with the dummy filter, as described, which is preferred.

Returning to FIG. 1, the video camera 10 has a housing 8. In FIG. 1 the housing 8 is rectangular, yet it should be noted that the camera housing may take many different forms, and for the purposes of the present embodiments any known form may be used (not excluding unknown forms, unless they make it impossible to realize the teachings herein). Furthermore, the functions performed by the camera may be affected in different units, such that an image is collected in one physical location and transferred for processing via a wire (or wireless) to another unit. Such approaches are not uncommon in applications where it is a benefit that the image collection portion of the camera is kept as small as possible. An image processor or video processor 22 (or a combination thereof) is arranged to process image data collected by the image sensor 12, and to feed it forward to an encoder 28. A central processing unit 24 is arranged to control the processes, and in FIG. 1 the central processing unit 24 represents all control units of the camera, although in a practical installation the processing control may be distributed in different units. In most cases the camera (or one of the units, referring to the above text) will also comprise a network interface 26 for communication beyond the constraints of the camera. The above description is understandably a very simplified account for a modern video camera, and for a more detailed knowledge the interested reader may turn to the product portfolio of the present applicant. The overall flow obviously has the direction from the image sensor 12 towards the encoder 28 and the network interface 26, yet there are feed-back mechanisms going the other way as well.

The invention claimed is:

1. An arrangement for determining an amount of light reaching an image sensor of a video camera, said video camera comprising an imaging lens system guiding a beam path towards the image sensor, wherein the arrangement comprises:
   a transparent probing element through which the beam path passes on its way to the image sensor, and
   a light sensor arranged in an end of the transparent probing element,
   wherein the light sensor is arranged to collect light being scattered or reflected in the transparent probing element,
   wherein the transparent probing element doubles as a dummy glass filter configured to pass both visible and infrared light and being used during night-mode operation of the video camera alternate to an IR-cut filter being used during day-mode operation of the video camera.

2. The arrangement of claim 1, wherein the light sensor is mounted to one lateral edge of the transparent probing element.

3. The arrangement of claim 1, wherein lateral edges of the transparent probing element are reflective to wavelengths detectable with the light sensor.

4. The arrangement of claim 3, where the reflectivity is accomplished by means of a surface coating or a prism shape of the lateral edges.

5. The arrangement of claim 1, wherein the transparent probing element is arranged in front of the image sensor, closer to the image sensor than to an aperture plane of the imaging lens system.

6. The arrangement of claim 1, wherein the transparent probing element is arranged between lenses of the imaging lens system, near or in an aperture plane of the imaging lens system.

7. The arrangement of claim 1, wherein the transparent probing element is an optical flat.

8. The arrangement of claim 1, wherein the light sensor is configured to measure a light level during a time exceeding an exposure time for the video camera.

9. The arrangement of claim 1, where the arrangement is configured to control a switch between a night-mode and a day-mode of the video camera.

10. The arrangement of claim 1, wherein the arrangement is retractably arranged, such that it may be inserted into, and retracted out of, the beam path.

11. The arrangement of claim 1, wherein the arrangement is fixedly mounted.

12. A lens system comprising an arrangement for determining an amount of light reaching an image sensor of a video camera, said video camera comprising an imaging lens system guiding a beam path towards the image sensor, wherein the arrangement comprises:
   a transparent probing element through which the beam path passes on its way to the image sensor, and
   a light sensor arranged in an end of the transparent probing element,
   wherein the light sensor is arranged to collect light being scattered or reflected in the transparent probing element,
   wherein the transparent probing element doubles as a dummy glass filter configured to pass both visible and infrared light and being used during night-mode operation of the video camera alternate to an IR-cut filter being used during day-mode operation of the video camera.

13. A video camera comprising an arrangement for determining an amount of light reaching an image sensor of the video camera, said video camera comprising an imaging lens system guiding a beam path towards the image sensor, wherein the arrangement comprises:
   a transparent probing element through which the beam path passes on its way to the image sensor, and
   a light sensor arranged in an end of the transparent probing element,
   wherein the light sensor is arranged to collect light being scattered or reflected in the transparent probing element,
   wherein the transparent probing element doubles as a dummy glass filter configured to pass both visible and infrared light and being used during night-mode operation of the video camera alternate to an IR-cut filter being used during day-mode operation of the video camera.

* * * * *